Nov. 13, 1962     R. SCHMIDT     3,063,265
COUPLING DEVICE
Filed Dec. 29, 1961

Richard Schmidt,
*INVENTOR.*

BY

United States Patent Office 3,063,265
Patented Nov. 13, 1962

3,063,265
COUPLING DEVICE
Richard Schmidt, 231 High Road, Skyline Acres,
Madison, Ala.
Filed Dec. 29, 1961, Ser. No. 163,367
3 Claims. (Cl. 64—31)
(Granted under Title 35, U.S. Code (1952), sec. 266)

The invention described herein may be manufactured and used by or for the Government for governmental purposes without the payment of any royalty thereon.

This invention relates to coupling devices and more particularly to a device for coupling two parallel, non-coaxial, rotating shafts.

It is often necessary to couple two rotating shafts which are parallel but not coaxial so that the rotational speed of the first or drive shaft is the same as the rotational speed of the second or driven shaft.

It is an object of this invention to provide a coupling whereby one rotating shaft may drive another shaft rotating in the same direction when the shaft axes are parallel but not coaxial.

It is another object of this invention to provide a coupling for non-coaxial, rotating shafts so that the angular velocity of the shafts remains the same.

It is a further object of this invention to provide a coupling means between two rotating, non-coaxial shafts whereby the perpendicular displacement between the shaft axes can be accurately adjusted over a substantial distance which is dependent upon the size of the coupling device.

A further object of this invention is to provide a coupling which is simple in construction, efficient in operation, and inexpensive to manufacture.

According to the present invention the foregoing and other objects are attaining by providing a novel coupling device between the adjacent ends of two non-coaxial rotating shafts. The coupling device consists of two cylindrical plates secured together by any suitable means such as a screw extending through the center of each plate. Each plate has an outwardly extending pin disposed near the periphery of the plate for engagement with a collar secured over the adjacent ends of each shaft. The plates may be angularly displaced, one with respect to the other, to any desired position and secured in this position by tightening the central screw.

The invention will be more fully understood through the following detailed description taken in conjunction with the accompanying drawings wherein like reference numerals designate identical or corresponding parts throughout the several views.

Figure 1:
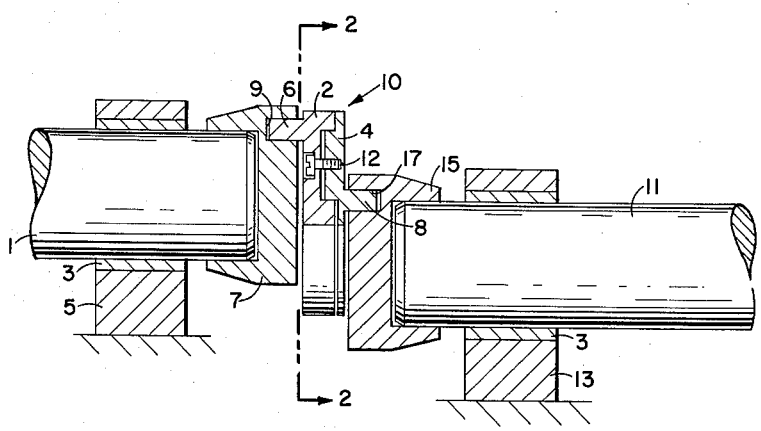
FIGURE 1 is an elevational view in section of two shafts coupled together in accordance with the present invention.

Referring to FIGURE 1 a shaft 1 is shown mounted for rotation in a bushing 3 suitably supported in a bearing 5. A collar 7, which is press fitted, keyed, or rigidly secured to shaft 1 in any desired manner, has three equiangularly spaced cylindrical recesses 9. While three recesses are shown as the preferred number, a lesser or larger number could be employed. A second shaft 11 is mounted for rotation in a bushing 3 suitably supported in bearing 13. A collar 15, which is rigidly secured to shaft 11 in the same manner that collar 7 is secured to shaft 1, has three equiangularly spaced cylindrical recesses 17. The non-coaxial shafts are shown to be parallel and are designed to rotate at the same angular speed.

The coupling member 10 is shown connecting the adjacent ends of shaft 1 and 11 through collars 7 and 15.

Member 10 consists of two cylindrical plates 2 and 4 having integrally formed cylindrical pins 6 and 8 extending in opposite directions for engagement with cylindrical recesses 9 and 17 respectively. A screw 12 is inserted through an opening 18 in plate 2 and threadably engages with a threaded opening 20 in plate 4. Thus, by tightening screw 12 the inclined projecting face of plate 4 is securely fitted in the inclined annular recess of plate 2.

Figures 2, 3:
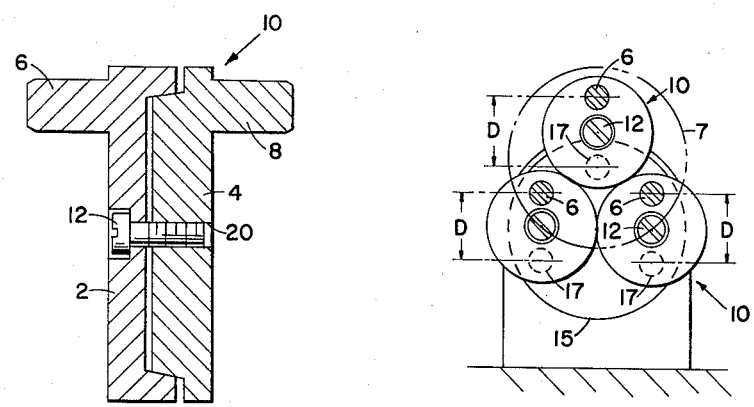
FIGURE 2 is a view taken along lines 2—2 of FIGURE 1.
FIGURE 3 is an elevational view in section showing the coupling device.

Referring to FIGURE 2, the relationship between coupling members 10 and collar 15 is shown when the shafts have their axes perpendicularly displaced at a maximum distance from each other as shown by distance D. This maximum distance is equal to the length of a straight line drawn between the longitudinal axes of pins 6 and 8 when these pins are 180° apart. In order to move the shafts closer to alignment, screws 12 are loosened and pins 6 and 8 are moved closer together until the desired angular distance between the pins is attained. When the shafts are in a completely aligned position, the pins 6 and 8 would be coaxial as shown in FIGURE 3.

Referring to FIGURE 3 the coupling member is shown with pin 8 rotated 180° from its position shown by FIGURE 1. With all three coupling members in this position the coupling device would provide coaxial alignment between the shafts.

Obviously, numerous modifications and variations of the present invention are possible in the light of the above teachings. It is, therefore, to be understood that within the scope of the appended claims the invention may be practiced otherwise than as specifically described herein.

I claim:

1. In a coupling device, a pair of substantially parallel, non-coaxial, rotating shafts, said shafts having adjacent ends, a collar secured over the adjacent end of each shaft, each collar having a cylindrical recess near the outer periphery thereof, a disc-shaped member disposed between said collars for engagement therewith, said member having two pins extending in opposite directions, said pins being integrally mounted on said disc-shaped member to provide relative angular movement from each other near the outer periphery of said member and adapted for engagement with the recesses on said collars.

2. In a coupling device, a pair of substantially parallel, non-coaxial, rotating shafts, said shafts having adjacent ends, a collar secured over the adjacent end of each shaft, each collar having a cylindrical recess near the outer periphery thereof, a disc-shaped member disposed between said collars for engagement therewith, said member comprising a first and second cylindrical plate of equal diameter each having a central opening extending therethrough, said first plate having an annular projecting outer face, said second plate having an outer annular recessed face for engagement with said outer projecting face, a screw extending through the opening of the said second plate and adapted to threadably engage said first plate so that said plates may be locked together in any desired angular position, each of said plates having an integrally formed pin, said pins extending in opposite directions and providing relative angular movement from each other near the outer periphery of said plates and adapted for engagement with the recesses on said collars.

3. In a coupling device, a pair of substantially parallel, non-coaxial, rotating shafts, said shafts having adjacent ends, a collar secured over the adjacent end of each shaft, three disc-shaped members equiangularly disposed between said collars, each of said disc-shaped members comprising a first and second cylindrical plate of equal diameter each having a central opening extending therethrough, said first plate having an annular projecting outer face, said second plate having an outer annular recessed face for engagement with said outer projecting face, a screw extending through the opening of said second plate and adapted to threadably engage said first plate so that said plates may be locked together in any desired angular position, each of said plates having an integrally formed pin, said pins extending in opposite directions and providing relative angular movement from each other near the outer periphery of said plates, each of said collars having three equiangularly spaced cylindrical recesses near the outer periphery thereof for engagement with the respective pins of each disc-shaped member.

References Cited in the file of this patent

UNITED STATES PATENTS

| | | |
|---|---|---|
| 1,862,220 | Johnson | June 7, 1932 |
| 2,343,244 | Rose | Mar. 7, 1944 |
| 2,932,255 | Neukirch | Apr. 12, 1960 |
| 3,024,627 | Karas | Mar. 13, 1962 |